US009733803B2

(12) United States Patent
Ghosh et al.

(10) Patent No.: US 9,733,803 B2
(45) Date of Patent: Aug. 15, 2017

(54) POINT OF INTEREST COLLABORATIVE E-READING

(71) Applicant: Rakuten Kobo, Inc., Toronto (CA)

(72) Inventors: Vanessa Ghosh, Toronto (CA);
Benjamin Landau, Toronto (CA)

(73) Assignee: Rakuten Kobo, Inc., Toronto (CA)

( * ) Notice: Subject to any disclaimer, the term of this patent is extended or adjusted under 35 U.S.C. 154(b) by 191 days.

(21) Appl. No.: 14/526,150

(22) Filed: Oct. 28, 2014

(65) Prior Publication Data

US 2016/0117067 A1 Apr. 28, 2016

(51) Int. Cl.
*G06F 3/00* (2006.01)
*G06F 3/0483* (2013.01)
*G06F 15/02* (2006.01)
*G06F 17/24* (2006.01)

(52) U.S. Cl.
CPC ........ *G06F 3/0483* (2013.01); *G06F 15/0291* (2013.01); *G06F 17/241* (2013.01)

(58) Field of Classification Search
CPC combination set(s) only.
See application file for complete search history.

(56) References Cited

U.S. PATENT DOCUMENTS

| 8,793,575 | B1* | 7/2014 | Lattyak | G09B 5/062 |
| | | | | 715/273 |
| 9,264,501 | B1* | 2/2016 | Story, Jr. | H04L 67/22 |
| 9,311,288 | B2* | 4/2016 | Thorne | G06F 17/241 |
| 2010/0306122 | A1* | 12/2010 | Shaffer | G06Q 99/00 |
| | | | | 705/319 |
| 2011/0045816 | A1* | 2/2011 | Wang | G06F 3/038 |
| | | | | 455/420 |
| 2011/0087955 | A1* | 4/2011 | Ho | G06F 17/211 |
| | | | | 715/230 |
| 2012/0047455 | A1* | 2/2012 | Yuan | G06F 15/0291 |
| | | | | 715/781 |
| 2012/0204086 | A1* | 8/2012 | Stoner | G06F 17/214 |
| | | | | 715/201 |
| 2013/0239020 | A1* | 9/2013 | Heo | G06Q 10/10 |
| | | | | 715/753 |
| 2014/0040021 | A1* | 2/2014 | Coleman | G06Q 30/0241 |
| | | | | 705/14.49 |
| 2014/0089775 | A1* | 3/2014 | Worsley | G06F 17/30575 |
| | | | | 715/230 |
| 2014/0191976 | A1* | 7/2014 | Peevers | G10L 21/10 |
| | | | | 345/173 |
| 2014/0351212 | A1* | 11/2014 | Lin | G06F 17/30174 |
| | | | | 707/624 |

* cited by examiner

*Primary Examiner* — Hien Duong
(74) *Attorney, Agent, or Firm* — Oblon, McClelland, Maier & Neustadt, L.L.P.

(57) ABSTRACT

A computing device includes a housing and a display assembly having a screen and a set of touch sensors. The housing at least partially circumvents the screen so that the screen is viewable. A processor is provided within the housing to manage an e-book library associated with the computing device. Specifically, the e-book library includes at least a first e-book. The processor further associates the computing device with a reading group having a plurality of group members, and detects that a copy of the first e-book resides in an e-book library of a first group member of the plurality of group members. Upon detecting the copy of the first e-book, the processor then selectively initiates a shared reading mode for the first e-book.

24 Claims, 10 Drawing Sheets

POINT OF INTEREST COLLABORATIVE E-READING

TECHNICAL FIELD

Examples described herein relate to a computing device that enables a shared reading experience among readers of the same e-book.

BACKGROUND

An electronic personal display is a mobile computing device that displays information to a user. While an electronic personal display may be capable of many of the functions of a personal computer, a user can typically interact directly with an electronic personal display without the use of a keyboard that is separate from or coupled to but distinct from the electronic personal display itself. Some examples of electronic personal displays include mobile digital devices/tablet computers such (e.g., Apple iPad®, Microsoft® Surface™, Samsung Galaxy Tab® and the like), handheld multimedia smartphones (e.g., Apple iPhone®, Samsung Galaxy S®, and the like), and handheld electronic readers (e.g., Amazon Kindle®, Barnes and Noble Nook®, Kobo Aura HD, and the like).

Some electronic personal display devices are purpose built devices that are designed to perform especially well at displaying readable content. For example, a purpose built purpose build device may include a display that reduces glare, performs well in high lighting conditions, and/or mimics the look of text on actual paper. While such purpose built devices may excel at displaying content for a user to read, they may also perform other functions, such as displaying images, emitting audio, recording audio, and web surfing, among others.

There also exist numerous kinds of consumer devices that can receive services and resources from a network service. Such devices can operate applications or provide other functionality that links a device to a particular account of a specific service. For example, e-reader devices typically link to an online bookstore, and media playback devices often include applications which enable the user to access an online media library. In this context, the user accounts can enable the user to receive the full benefit and functionality of the device.

DETAILED DESCRIPTION

Figure 1:
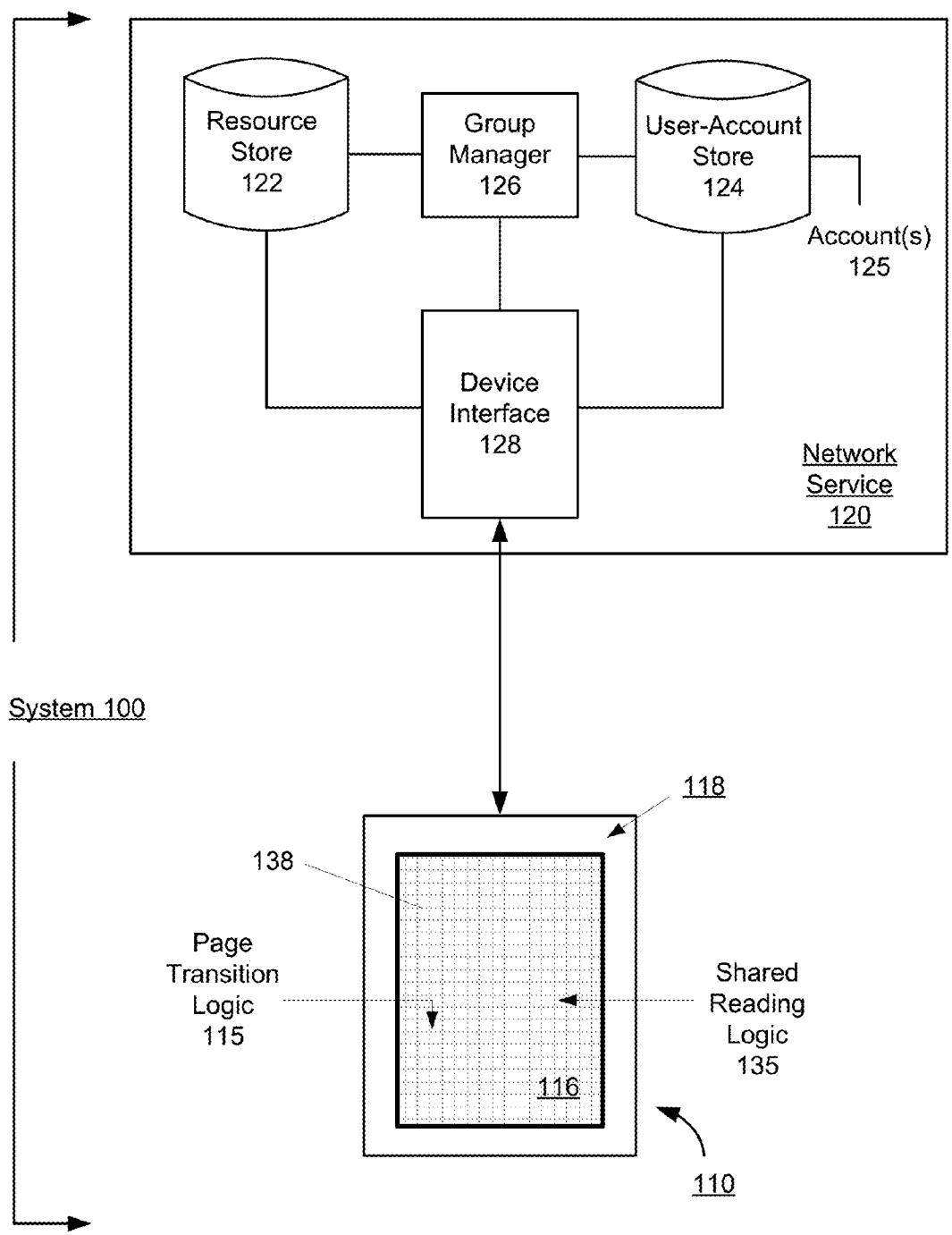
FIG. 1 illustrates a system for utilizing applications and providing e-book services on a computing device, according to an embodiment.

Embodiments described herein provide for a computing device that provides a shared reading experience among readers of the same e-book. A user of the computing device may create a shared reading group among other readers of e-book content. Further, the computing device may detect one or more e-books, in the user's e-book library, that are shared by other members of the group (e.g., common among their e-book libraries). The computing device may then enable a shared reading experience among group members that own or possess the shared e-book. For example, during a shared reading mode, the computing device may indicate a reading progress of other group members reading the shared e-book. The computing device may also compare the relative reading progress of the user to that of the other group members, and generate notifications when the user has surpassed other group members, and vice-versa. Still further, the computing device may enable the user to post annotations (e.g., associated with particular e-book content) in the shared e-book to be viewed by other group members, and vice-versa.

According to some embodiments, a computing device includes a housing and a display assembly having a screen and a set of touch sensors. The housing at least partially circumvents the screen so that the screen is viewable. A processor is provided within the housing to manage an e-book library associated with the computing device. Specifically, the e-book library includes at least a first e-book. The processor associates the computing device with a reading group having a plurality of group members. The processor further detects that a copy of the first e-book resides in an e-book library of a first group member of the plurality of group members. Upon detecting the copy of the first e-book, the processor enables a user of the computing device to initiate a shared reading experience with the first group member. For example, the processor may display a notification on the screen indicating that the first e-book is shared by the first group member.

For some embodiments, the processor may monitor a reading progress of the first group member with respect to the shared e-book. For example, the processor may display the reading progress of the first group member on the screen. The processor may also monitor a reading progress of the user with respect to the shared e-book and compare the reading progress of the user with the reading progress of the first group member. The processor may then display a notification on the screen based on the comparison. For example, the processor may display a first notification when the reading progress of the user surpasses the reading progress of the first group member. Additionally, and/or alternatively, the processor may display a second notification when the reading progress of the first group member surpasses the reading progress of the user.

For other embodiments, the processor may enable the user to post annotations in the shared e-book for the first group member to read. For example, the processor may receive a first input via the set of touch sensors corresponding to a first annotation, and associate the first annotation with content pertaining to the shared e-book. The processor may then send the first annotation to the e-book library of the first group member to be stored in associated with the copy of the first e-book. Still further, in some embodiments, the processor may receive a second annotation from the first group member. Specifically, the second annotation may be associated with content pertaining to the shared e-book. The processor may then enable the user to view the second annotation when the corresponding content is presented on the screen, or ignore the second annotation (e.g., to be viewed at a later time).

Among other benefits, examples described herein provide an enhanced reading experience to users of e-reader devices (or similar computing devices that operate as e-reading devices). Specifically, the shared reading experience adds a social component to the reading of e-books by enabling users of e-reading devices to engage and/or interact with other users who are reading the same e-book. For example, by presenting the user with the reading progress of other group members, the shared reading experience may allow group members to engage one another in friendly competition (e.g., to see who can read through the shared e-book quickest) and/or pace themselves relative to other group members (e.g., to ensure that they are "on the same page" when discussing the shared e-book). Furthermore, by allowing users to post annotations in their shared e-books, the shared reading experience may facilitate richer discussion among group members with respect to particular e-book content (e.g., group members can post their theories, opinions, and/or questions at crucial points of the story).

"E-books" are a form of an electronic publication that can be viewed on computing devices with suitable functionality. An e-book can correspond to a literary work having a pagination format, such as provided by literary works (e.g., novels) and periodicals (e.g., magazines, comic books, journals, etc.). Optionally, some e-books may have chapter designations, as well as content that corresponds to graphics or images (e.g., such as in the case of magazines or comic books). Multi-function devices, such as cellular-telephony or messaging devices, can utilize specialized applications (e.g., e-reading apps) to view e-books. Still further, some devices (sometimes labeled as "e-readers") can be centric towards content viewing, and e-book viewing in particular. A "shared e-book" is any e-book that is common to two or more e-book libraries (e.g., belonging to two or more different users). More specifically, each of the users may own or possess a "copy" of a shared e-book (e.g., which may be stored locally on their respective devices).

An "e-reading device" can refer to any computing device that can display or otherwise render an e-book. By way of example, an e-reading device can include a mobile computing device on which an e-reading application can be executed to render content that includes e-books (e.g., comic books, magazines etc.). Such mobile computing devices can include, for example, a mufti-functional computing device for cellular telephony/messaging (e.g., feature phone or smart phone), a tablet device, an ultramobile computing device, or a wearable computing device with a form factor of a wearable accessory device (e.g., smart watch or bracelet, glasswear integrated with computing device, etc.). As another example, an e-reading device can include an e-reader device, such as a purpose-built device that is optimized for e-reading experience (e.g., with E-ink displays etc.).

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer programs, or a computer usable carrier medium capable of carrying such a program.

System Description

FIG. 1 illustrates a system 100 for utilizing applications and providing e-book services on a computing device, according to an embodiment. In an example of FIG. 1, system 100 includes an electronic display device, shown by way of example as an e-reading device 110, and a network service 120. The network service 120 can include multiple servers and other computing resources that provide various services in connection with one or more applications that are installed on the e-reading device 110. By way of example, in one implementation, the network service 120 can provide e-book services which communicate with the e-reading device 110. The e-book services provided through network service 120 can, for example, include services in which e-books are sold, shared, downloaded and/or stored. More generally, the network service 120 can provide various other content services, including content rendering services (e.g., streaming media) or other network-application environments or services.

The e-reading device 110 can correspond to any electronic personal display device on which applications and application resources (e.g., e-books, media files, documents) can be rendered and consumed. For example, the e-reading device 110 can correspond to a tablet or a telephony/messaging device (e.g., smart phone). In one implementation, for example, e-reading device 110 can run an e-reading application that links the device to the network service 120 and enables e-books provided through the service to be viewed and consumed. In another implementation, the e-reading device 110 can run a media playback or streaming application that receives files or streaming data from the network service 120. By way of example, the e-reading device 110 can be equipped with hardware and software to optimize certain application activities, such as reading electronic content (e.g., e-books). For example, the e-reading device 110 can have a tablet-like form factor, although variations are possible. In some cases, the e-reading device 110 can also have an E-ink display.

In additional detail, the network service 120 can include a device interface 128, a resource store 122, a user account store 124, and a group manager 126. The user account store 124 can associate the e-reading device 110 with a user and with an account 125. The account 125 can also be associated with one or more application resources (e.g., e-books), which can be stored in the resource store 122. As described further, the user account store 124 can retain metadata for individual accounts 125 to identify resources that have been purchased or made available for consumption for a given account. The e-reading device 110 may be associated with the user account 125, and multiple devices may be associated with the same account. As described in greater detail below, the e-reading device 110 can store resources (e.g., e-books) that are purchased or otherwise made available to the user of the e-reading device 110, as well as to archive e-books and other digital content items that have been purchased for the user account 125, but are not stored on the particular computing device.

For some embodiments, the group manager 126 may associate one or more user accounts 125 with a shared reading group. The group manager 126 may further transmit content and/or information pertaining to the shared reading group to the e-reading device 110 (e.g., via the device interface 128). For example, the group manager 126 may send information to the e-reading device 110 identifying e-books that are owned by or otherwise associated with user accounts 125 of one or more members of the shared reading group. In some embodiments, the group manager 126 may compare an e-book library of a user of the e-reading device 110 with e-book libraries of other group members to identify one or more shared e-books (e.g., e-books that are common to the e-book libraries). The group manager 126 may then send information to the e-reading device 110 identifying the shared e-books (e.g., e-books that the user has in common with other group members).

Further, for some embodiments, the group manager 126 may transmit information to the e-reading device 110 indicating a reading progress of one or more group members that own or are in possession of the shared e-books. For example, the reading progress of each group member may correspond with a current page state (e.g., page number or location identifier) and/or percentage of the shared e-book read by that group member. Still further, for some embodiments, the group manager 126 may transmit one or more e-book annotations to the e-reading device 100. For example, the annotations may correspond with notes or comments by other group members. More specifically, each annotation may be associated with a particular page state of the shared e-book and/or content provided thereon.

With reference to an example of FIG. 1, e-reading device 110 can include a display screen 116 and a housing 118. In an embodiment, the display screen 116 is touch-sensitive, to process touch inputs including gestures (e.g., swipes). For example, the display screen 116 may be integrated with one or more touch sensors 138 to provide a touch sensing region on a surface of the display screen 116. For some embodiments, the one or more touch sensors 138 may include capacitive sensors that can sense or detect a human body's capacitance as input. In the example of FIG. 1, the touch sensing region coincides with a substantial surface area, if not all, of the display screen 116. Additionally, the housing 118 can also be integrated with touch sensors to provide one or more touch sensing regions, for example, on the bezel and/or back surface of the housing 118. The e-reading device 110 may therefore detect and interpret user input made through interaction with the touch sensors 138.

In some embodiments, the e-reading device 110 includes features for providing functionality related to displaying paginated content. For example, the page transition logic 115 may enable the user to transition through paginated content (such as e-books). The e-reading device 110 can display pages from e-books, and enable the user to transition from one page state to another. In particular, an e-book can provide content that is rendered sequentially in pages, and the e-book can display page states in the form of single pages, multiple pages, or portions thereof. Accordingly, a given page state can coincide with, for example, a single page, or two or more pages displayed at once. The page transition logic 115 may enable single page transitions, chapter transitions, and/or cluster transitions (e.g., multiple pages at one time).

The page transition logic 115 can be responsive to various kinds of interfaces and actions in order to enable page transitioning. In one implementation, the user can signal a page transition by, for example, interacting with the touch sensing region of the display 116. For example, the user can trigger a page turn (e.g., a forward or backward page transition) input by tapping the surface of the display 116. Alternatively, and/or additionally, the user may trigger a page turn input by swiping the surface of the display 116 (e.g., in the direction of the desired page turn or transition).

Still further, for some embodiments, the e-reading device 110 may include a shared reading logic 135 to activate a shared reading mode on the e-reading device 110. For example, the shared reading logic 135 may enable the user of the e-reading device 110 to create a shared reading group by entering the names and/or account information for one or more e-book users to be added to the group. The shared reading logic 135 may then retrieve content and/or information pertaining to the shared reading group from the network service 120. As described above, the group manager 126 may send information to the e-reading device 110 identifying one or more shared e-books, reading progress of the shared e-books, and/or annotations associated with the shared e-books from other members of the shared reading group.

The shared reading logic 135 may then determine that an open e-book (e.g., that is currently being read by the user) on the e-reading device 110 corresponds to a shared e-book. In other words, at least one other group member may own or otherwise be in possession of a copy of the open e-book. Upon determining that the open e-book is shared by another group member, the shared reading logic 135 may enable a shared reading mode, with respect to the open e-book, on the e-reading device 100. For some embodiments, the shared reading logic 135 may display a reading progress of the user and/or a reading progress of the other group member(s). More specifically, the shared reading logic 135 may generate a notification on the display 116 when the reading progress of the user surpasses the reading progress of the other group member, and vice-versa. Further, the shared reading logic 135 may transmit the reading progress of the user to the network service 120 to be shared with other members of the shared reading group.

Still further, for some embodiments, the shared reading logic 135 may display or otherwise enable the user to view e-book annotations by other group members. For example, each annotation may be associated with a particular page state of the shared e-book and/or content provided thereon. Thus, when the user reaches the associated content in the shared e-book, the shared reading logic 135 may allow the user to view or ignore the corresponding annotation(s). The shared reading logic 135 may also enable the user to create or record annotations in the shared e-book that may be viewed by other members of the shared reading group. For example, the shared reading logic 135 may transmit annotations created by the user to the network service 120. The group manager 126 may then transmit the user's annotations to other group members having the shared e-book. Alternatively, and/or additionally, the group manager 126 may store the annotations in the resource store 122, in association with the corresponding e-book and/or content provided thereon.

Hardware Description

Figure 2:
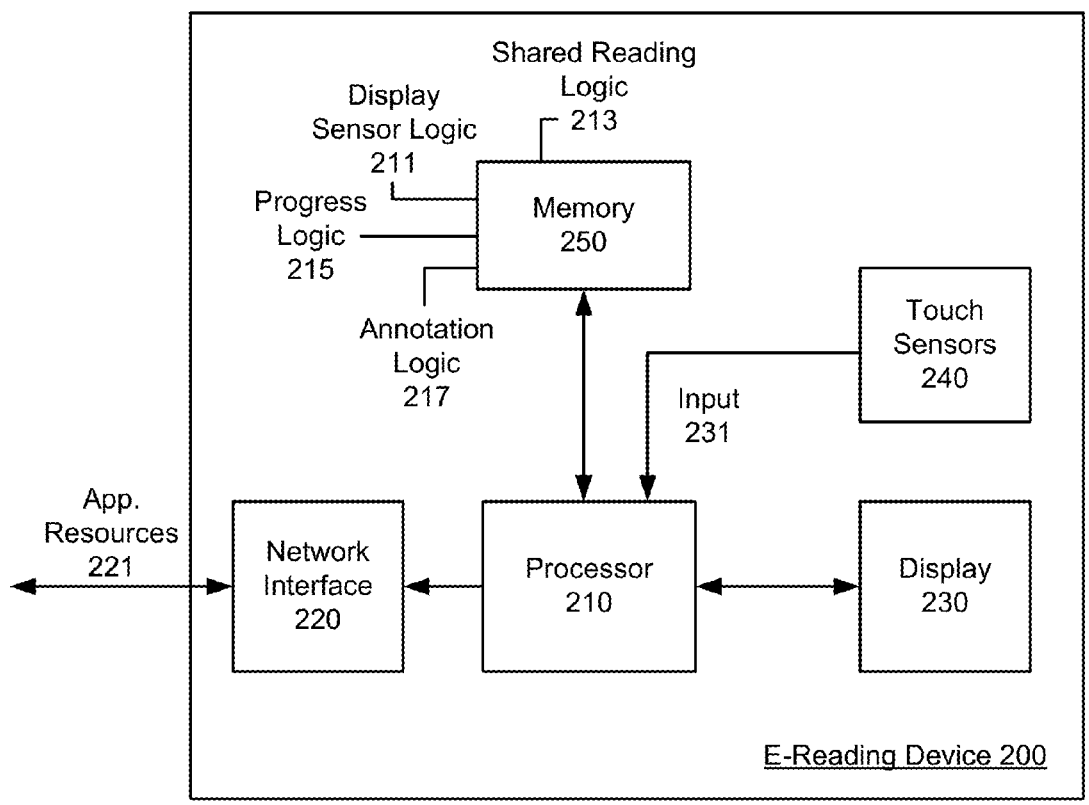
FIG. 2 illustrates an example of an e-reading device or other electronic personal display device, for use with one or more embodiments described herein.

FIG. 2 illustrates an example of an e-reading device 200 or other electronic personal display device, for use with one or more embodiments described herein. In an example of FIG. 2, an e-reading device 200 can correspond to, for example, the device 110 as described above with respect to FIG. 1. With reference to FIG. 2, e-reading device 200 includes a processor 210, a network interface 220, a display 230, one or more touch sensor components 240, and a memory 250.

The processor 210 can implement functionality using instructions stored in the memory 250. Additionally, in some implementations, the processor 210 utilizes the network interface 220 to communicate with the network service 120 (see FIG. 1). More specifically, the e-reading device 200 can access the network service 120 to receive various kinds of resources (e.g., digital content items such as e-books, configuration files, account information, shared reading content, etc.), as well as to provide information (e.g., user account information, service requests, shared reading content, etc.). For example, e-reading device 200 can receive application resources 221, such as e-books or media files, that the user elects to purchase or otherwise download from the network service 120. The application resources 221 that are downloaded onto the e-reading device 200 can be stored in the memory 250.

In some implementations, the display 230 can correspond to, for example, a liquid crystal display (LCD), an electrophoretic display (EPD), or a light emitting diode (LED) display that illuminates in order to provide content generated from processor 210. In some implementations, the display 230 can be touch-sensitive. For example, in some embodiments, one or more of the touch sensor components 240 may be integrated with the display 230. In other embodiments, the touch sensor components 240 may be provided (e.g., as a layer) above or below the display 230 such that individual touch sensor components 240 track different regions of the display 230. Further, in some variations, the display 230 can correspond to an electronic paper type display, which mimics conventional paper in the manner in which content is displayed. Examples of such display technologies include electrophoretic displays, electrowetting displays, and electrofluidic displays.

The processor 210 can receive input from various sources, including the touch sensor components 240, the display 230, and/or other input mechanisms (e.g., buttons, keyboard, mouse, microphone, etc.). With reference to examples described herein, the processor 210 can respond to input 231 from the touch sensor components 240. In some embodiments, the processor 210 responds to inputs 231 from the touch sensor components 240 in order to facilitate or enhance e-book activities such as generating e-book content on the display 230, performing page transitions of the e-book content, powering off the device 200 and/or display 230, activating a screen saver, launching an application, and/or otherwise altering a state of the display 230.

In some embodiments, the memory 250 may store display sensor logic 211 that monitors for user interactions detected through the touch sensor components 240 provided with the display 230, and further processes the user interactions as a particular input or type of input. In an alternative embodiment, the display sensor logic 211 may be integrated with the touch sensor components 240. For example, the touch sensor components 240 can be provided as a modular component that includes integrated circuits or other hardware logic, and such resources can provide some or all of the display sensor logic 211 (see also display sensor logic 135 of FIG. 1). For example, integrated circuits of the touch sensor components 240 can monitor for touch input and/or process the touch input as being of a particular kind. In variations, some or all of the display sensor logic 211 may be implemented with the processor 210 (which utilizes instructions stored in the memory 250), or with an alternative processing resource.

The memory 250 further stores shared reading logic 213 to enable a shared reading experience on the e-reading device 200. For example, the shared reading logic 213 may enable the user of the e-reading device 200 to create a shared reading group among other users of the network service 120. For some embodiments, the user of the e-reading device 200 may identify the other users to be added to the shared reading group by inputting their names and/or account information (e.g., using the touch sensors 240 and/or other input mechanisms) in a user interface generated by the shared reading logic 213. For example, each user's account 125 may be associated with a particular email address or phone number.

Once the shared reading group is created, the shared reading logic 213 may detect one or more shared e-books among the members of the shared reading group. For some embodiments, the shared reading logic 213 may compare the e-book library of the e-reading device 200 with the e-book libraries of other group members to identify one or more e-books that are common among the e-book libraries. In other embodiments, this comparison may be performed by the network service 120 (e.g., specifically, by the group manager 126), and the results of the comparison (e.g., a list of shared e-books) may be sent to the e-reading device 200 via the network interface 220.

The shared reading logic 213 may then activate a shared reading mode when the user opens or attempts to read the shared e-book on the e-reading device 200. For example, when the user opens the shared e-book on the e-reading device 200, the shared reading logic 213 may generate a notification on the display 230 indicating that the current e-book also belongs to another member of the shared reading group. The e-reading device 200 may then provide the user with an option to initiate a shared reading experience for the shared e-book. The shared reading mode enables the shared e-book to be read in a collaborative manner, for example, by allowing group members to view the reading progress of other members and/or share their thoughts and opinions with one another.

In one implementation, the shared reading logic 213 includes progress logic 215 and annotation logic 217. The progress logic 215 may determine a reading progress of each group member in the shared reading experience (e.g., based on information retrieved from the network service 120). For example, the reading progress may indicate a current page state (e.g., page number or location identifier) and/or percentage of the shared e-book read by the user and/or other group members. For some embodiments, the progress logic 215 may present the reading progress of each group member on the display 230. For example, the reading progress may be displayed concurrently with content from the shared e-book (e.g., as an overlay). Alternatively, and/or additionally, the reading progress may be displayed in a separate user interface for the shared reading experience. Displaying the reading progress of group members may allow each member of the shared reading group (e.g., including the user of the e-reading device 200) to track the progress of other members (e.g., to see who can finish reading the shared e-book the fastest or to ensure that they are on the same pace as the rest of the group). Further, in some embodiments, the progress logic 215 may compare the reading progress of the user to the reading progress of other group members. The progress logic 215 may further generate a notification on the display 230 when the reading progress of the user surpasses that of another group member, and vice-versa.

The annotation logic 217 may process e-book annotations sent to and/or from the e-reading device 200. E-book annotations may correspond with notes or comments posted by the user and/or other group members. More specifically, each annotation may be associated with a particular page state of the shared e-book and/or content provided thereon. For some embodiments, the annotation logic 217 may receive annotations for the shared e-book from the network service 120 and present the annotations on the display 230 when the user reaches the appropriate location in the shared e-book. For example, when the user of the e-reading device 200 reaches a plot twist in the shared e-book, the annotation logic 217 may display an annotation (e.g., as an overlay) from another group member expressing that member's theories and/or opinions on the plot twist. For some embodiments, the annotation logic 217 may generate a notification on the display 230 indicating that an annotation is available, and provide the user with the option to view or ignore the annotation. E-book annotations may be stored in memory 250. Thus, users who choose to ignore a particular annotation may have the option to view that annotation at a later time (e.g., via a user interface for the shared reading experience).

Still further, for some embodiments, the annotation logic 217 may also receive annotations from the user of the e-reading device 200. For example, the annotation logic 217 may provide an annotation menu and/or interface for the user to input text. When the user calls upon the annotation interface, the annotation logic 217 may record the current page state (e.g. page number, location identifier, and/or associated content) of the shared e-book. Then, when the user is finished inputting text into the annotation interface, the annotation logic 217 may send a record of the annotation along with the current page state of the shared e-book to the network service 120. Accordingly, other group members may be able to view the user's annotation when they reach the particular page state (or corresponding content) of the shared e-book associated with that annotation.

Shared Reading Experience

Figure 3:
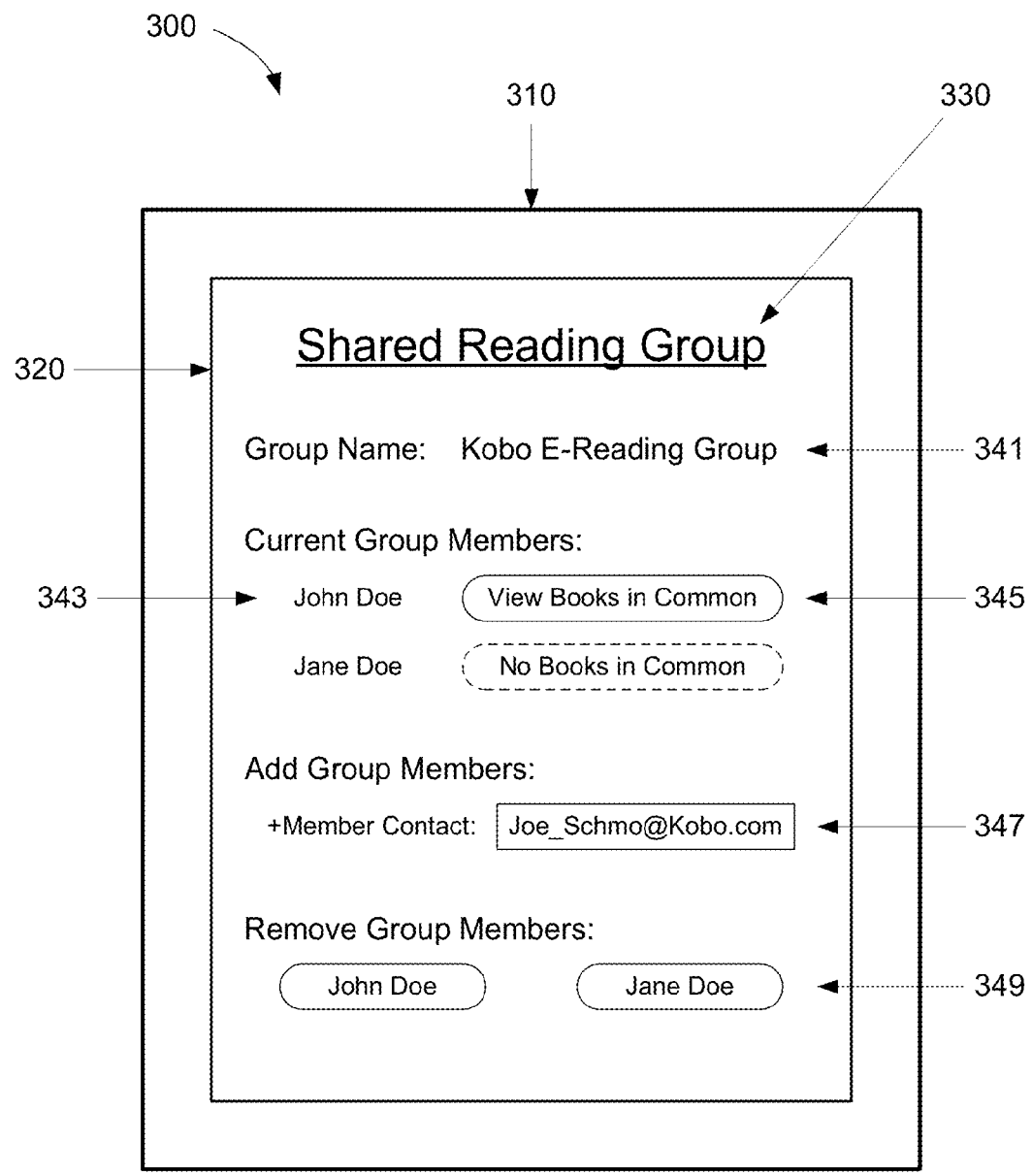
FIG. 3 illustrates an embodiment of an e-reading device that enables a user to create a shared reading group, according to one or more embodiments.

FIG. 3 illustrates an embodiment of an e-reading device 300 that enables a user to create a shared reading group, according to one or more embodiments. The e-reading device 300 includes a housing 310 and a display screen 320. The e-reading device 300 can be substantially tabular or rectangular, so as to have a front surface that is substantially occupied by the display screen 320 so as to enhance content viewing. More specifically, the front surface of the housing 310 may be in the shape of a bezel surrounding the display screen 320. The display screen 320 can be part of a display assembly, and can be touch sensitive. For example, the display screen 320 can be provided as a component of a modular display assembly that is touch-sensitive and integrated with housing 310 during a manufacturing and assembly process.

A touch sensing region 330 is provided with at least a portion of the display screen 320. Specifically, the touch sensing region 330 may coincide with the integration of touch sensors with the display screen 320. For some embodiments, the touch sensing region 330 may substantially encompass a surface of the display screen 320. Further, the e-reading device 300 can integrate one or more types of touch-sensitive technologies in order to provide touch sensitivity on the touch sensing region 330 of the display screen 320. It should be appreciated that a variety of well-known touch sensing technologies may be utilized to provide touch-sensitivity, including, for example, resistive touch sensors, capacitive touch sensors (using self and/or mutual capacitance), inductive touch sensors, and/or infrared touch sensors.

For example, the touch-sensing feature of the display screen 320 can be employed using resistive sensors, which can respond to pressure applied to the surface of the display screen 320. In a variation, the touch-sensing feature can be implemented using a grid pattern of electrical elements which can detect capacitance inherent in human skin. Alternatively, the touch-sensing feature can be implemented using a grid pattern of electrical elements which are placed over or just beneath the surface of the display screen 320, and which deform sufficiently on contact to detect touch from an object such as a finger.

A "shared reading group" menu is presented on the display screen 320 of the e-reading device 300 to allow the user to create and/or modify a shared reading group. The menu displays information pertaining to a particular shared reading group, including, for example, the group name 341 (e.g., "Kobo E-Reading Group") and the current group members 343 (e.g., John Doe and Jane Doe). The menu also provides the user with the option to add and/or remove group members. For example, a user may add members to the shared reading group by entering the desired group member's account information (e.g., name, e-mail address, phone number, user ID, etc.) in a corresponding text field 347. A user may remove a particular group member by tapping the icon 349 associated with that group member's name.

For some embodiments, the shared reading group menu may also enable the user to view books in common with one or more group members. For example, the user may tap the icon 345 associated with a particular group member to view a list of e-books that are common to both the user's library and another group member's (e.g., John Doe's) library. If a user opens, or attempts to read, an e-book on the list (e.g., a shared e-book), the e-reading device 300 may activate a shared reading mode (e.g., to provide a shared reading experience among group members who own or are in possession of a copy of the shared e-book).

It should be noted that the layout and content of the shared reading group menu of FIG. 3 are described for exemplary purposes only. In certain implementations, the shared reading group menu may include fewer or more features than those shown in FIG. 3.

FIGS. 4A-4E illustrate embodiments of an e-reading device 400 that is operable in a shared reading mode, according to one or more embodiments. The e-reading device 400 includes a housing 410 and a display screen 420. The display screen 420 can be part of a display assembly, and can be touch sensitive. A touch sensing region 430 is provided with at least a portion of the display screen 420. For simplicity, the circuitry and/or hardware components 410-430 may be substantially similar, if not identical, in function to corresponding circuitry and hardware components 310-330 of the e-reading device 300 (e.g., as described above with respect to FIG. 3).

Figure 4A:
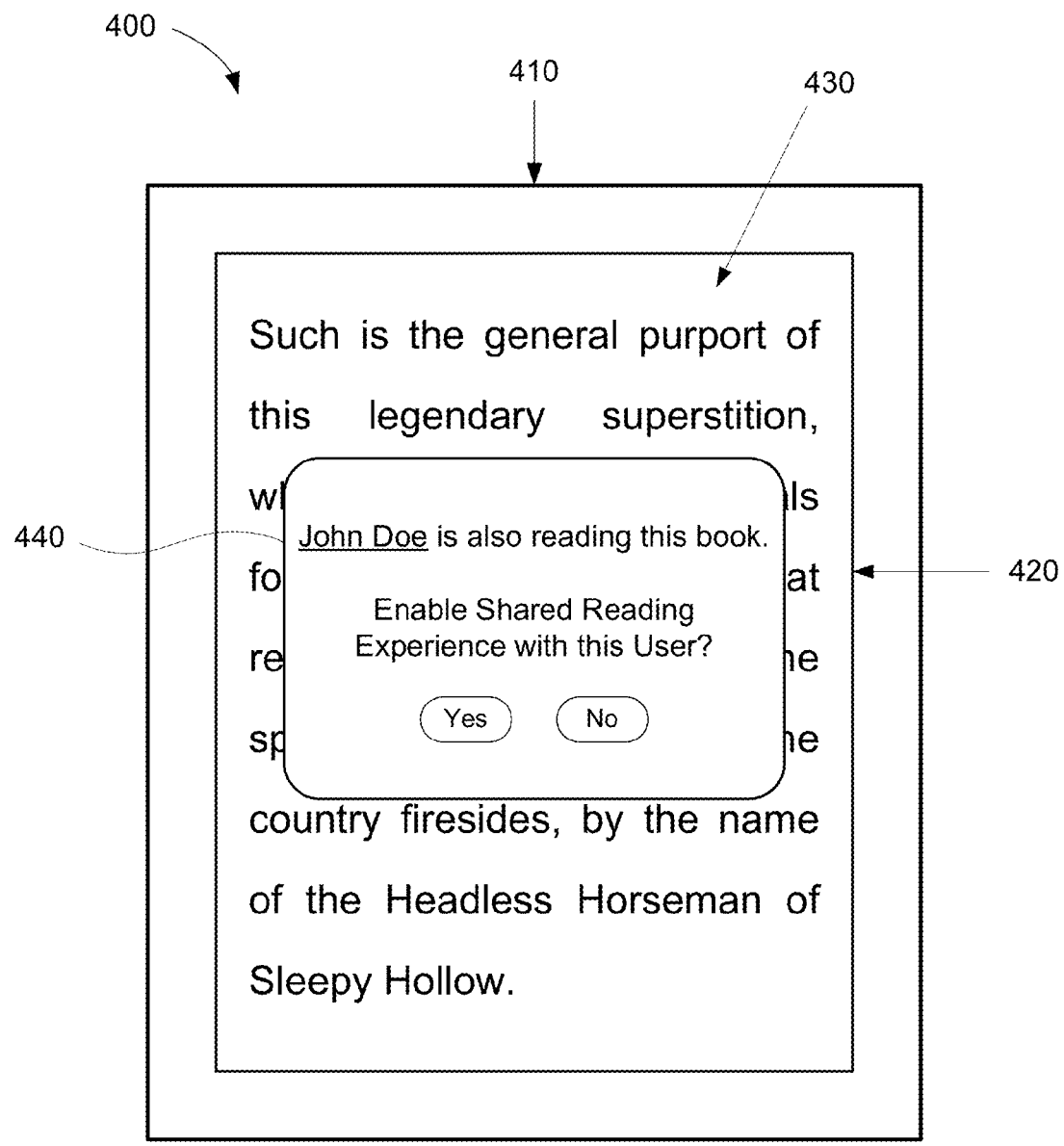
FIGS. 4A-4E illustrate embodiments of an e-reading device that is operable in a shared reading mode, according to one or more embodiments.

With reference to FIG. 4A, e-book content pertaining to an open e-book (e.g., an e-book that the user is currently reading) is displayed on the display screen 420. For some embodiments, the e-reading device 400 may detect that the open e-book is a shared e-book. For example, the e-reading device 400 may detect that another member (e.g., John Doe) of the shared reading group purchased and/or downloaded of the open e-book. Accordingly, the e-reading device 400 may display a notification 440 on the display screen 420 indicating the names of other group members who are reading (or own) the same e-book. In some embodiments, the notification 440 may also present the user with an option to enable a shared reading experience with the identified group member(s). For some embodiments, the notification 440 may be provided as a window or overlay on top of the e-book content displayed on the display screen 420 (e.g., as shown in FIG. 4A). Alternatively, the notification 440 may be provided separate from the content of the e-book (e.g., as an individual page state or interface). Through the notification window 440, the user may choose to enable the shared reading experience (e.g., by tapping the "yes" icon) or disable the shared reading experience (e.g., by tapping the "no" icon).

If a user chooses to enable the shared reading experience, the e-reading device 400 may enter a shared reading mode whereby e-book content may be presented with enhanced social features. For example, with reference to FIG. 4B, the e-reading device 400 may generate a special user interface for the shared reading experience. The user interface may display information that enhances a reading experience of the user, including, for example, the shared e-book title 441 (e.g., "Sleepy Hollow"), the user's reading progress 443 (e.g., 10%), and other group members' reading progress 445 (e.g., 0% for John Doe).

For some embodiments, the user interface may also include a text field 447 for the user to create an annotation (e.g., by inputting text into the text field 447 and tapping the "post" icon). For some embodiments, the e-reading device may display a virtual keyboard on the display screen 420 to enable the user to input text into the text field 447. Alternatively, the user may input text via a peripheral device (e.g., such as an external keyboard). The user may input text into the text field 447 and tap the "post" icon to send the annotation to other group members belonging to the shared reading experience. Still further, for some embodiments, the user interface may also enable the user to view old annotations posted by other group members, for example, by click the icon 449.

Figure 4B:
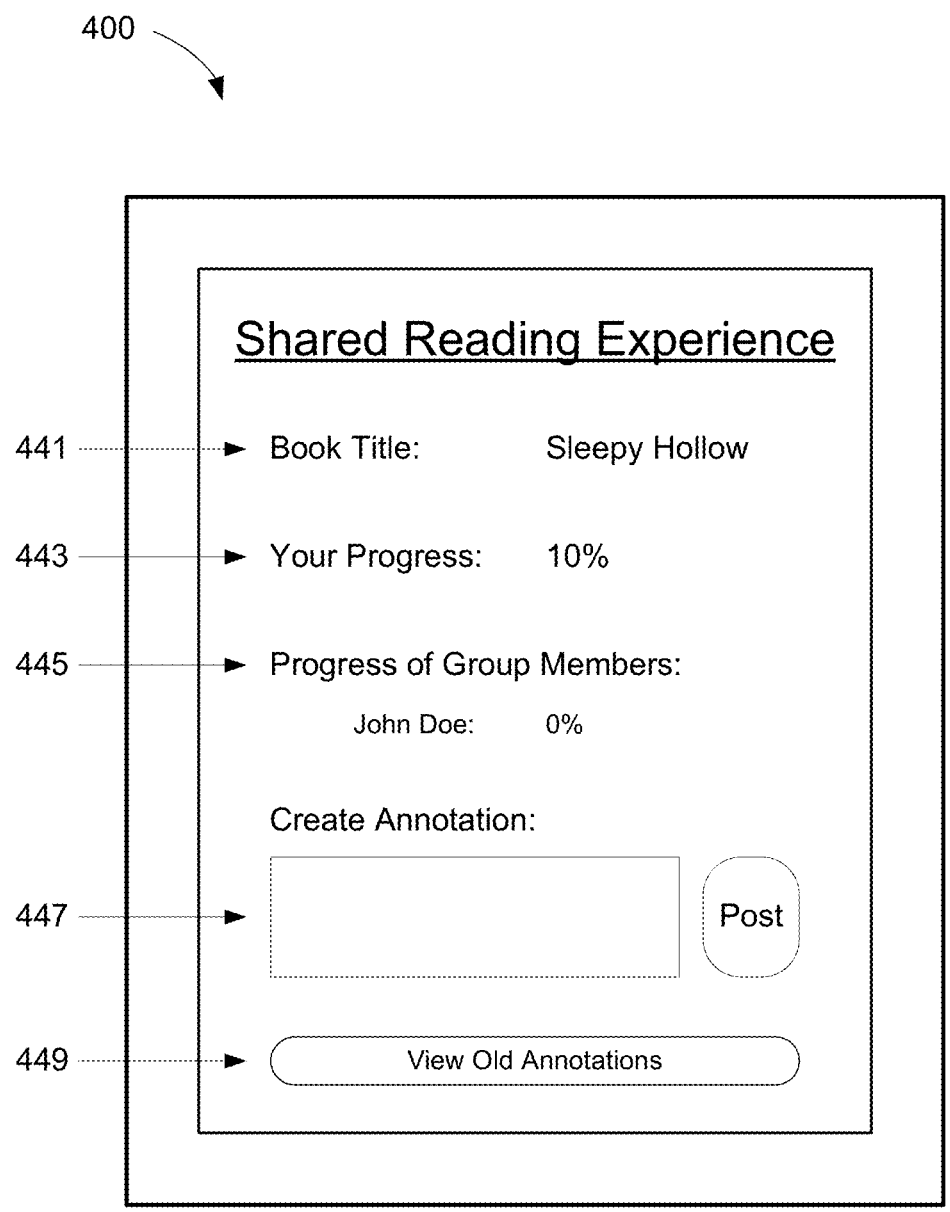

It should be noted that the layout and content of the user interface of FIG. 4B are described for exemplary purposes only. In certain implementations, the user interface may include fewer or more features than those shown in FIG. 4B.

For some embodiments, the e-reading device 400 may display a notification on the display screen 420 when another group member's reading progress surpasses the reading progress of the user. For example, with reference to FIG. 4C, the user's reading progress is displayed as a banner 452 across the upper edge of the display screen 420 (e.g., so as not to interfere with, or distract from, the actual e-book content). Similarly, another group member's (e.g., John Doe's) reading progress is displayed as a banner 454 across the bottom edge of the display screen 420. In this instance, the other group member is further along in the reading of the shared e-book than the user. Accordingly, the e-reading device 400 may display a notification 456 indicating that the other group member is now ahead of the user.

For other embodiments, the e-reading device 400 may display a notification on the display screen 420 when the user reaches a page state associated with one or more annotations (e.g., an "annotated page"). For example, with reference to FIG. 4D, the user's reading progress (e.g., 50%) is far behind the reading progress of the other group member (e.g., 80%). In this instance, the other group member has left annotations for the user on one or more previously-read pages. When the user reaches an annotated page, the e-reading device 458 may display a notification 458 indicating that an annotation by another group member (e.g., John Doe) is available for viewing. The notification window 458 may further provide the user with an option to view the annotation now (e.g., by tapping the "view" icon), view the annotation later (e.g., by tapping the "later" icon), or ignore this and all future annotations (e.g., by tapping the "never" icon). If the user chooses to view the annotation now, the e-reading device may subsequently display the selected annotation in a new notification window 460 (e.g., or in the previous notification window 458).

In the examples above, the notifications 456, 458, and 460 (e.g., of FIGS. 4C, 4D, and 4E, respectively) may be provided as a window or overlay on top of the e-book content displayed on the display screen 420. However, in other embodiments, some or all of the notifications 456, 458, and 460 may be provided separate from the content of the e-book (e.g., as an individual page state or interface).

Shared Reading Functionality

Figure 4C:
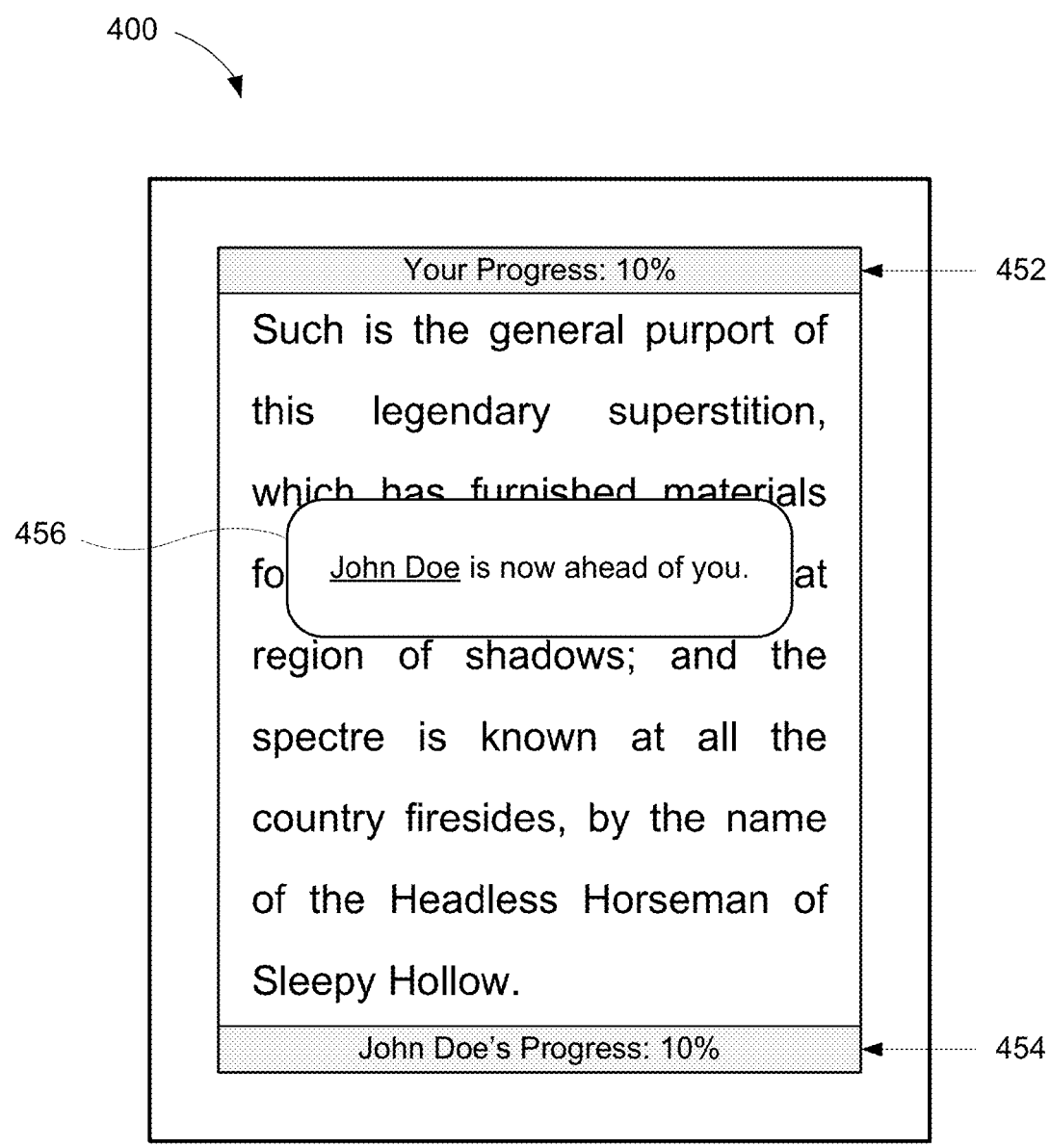
Figure 4D:
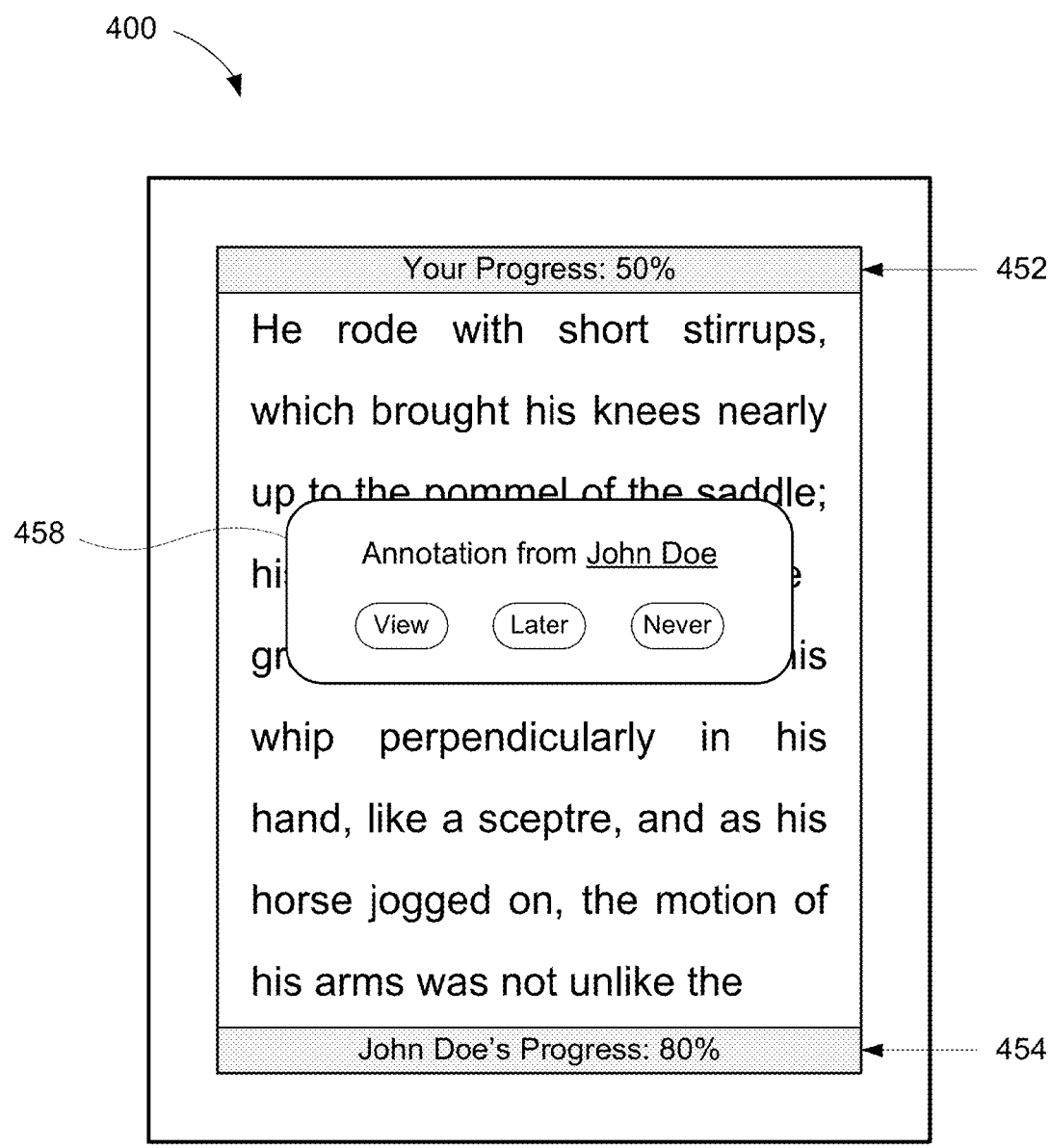
Figure 4E:
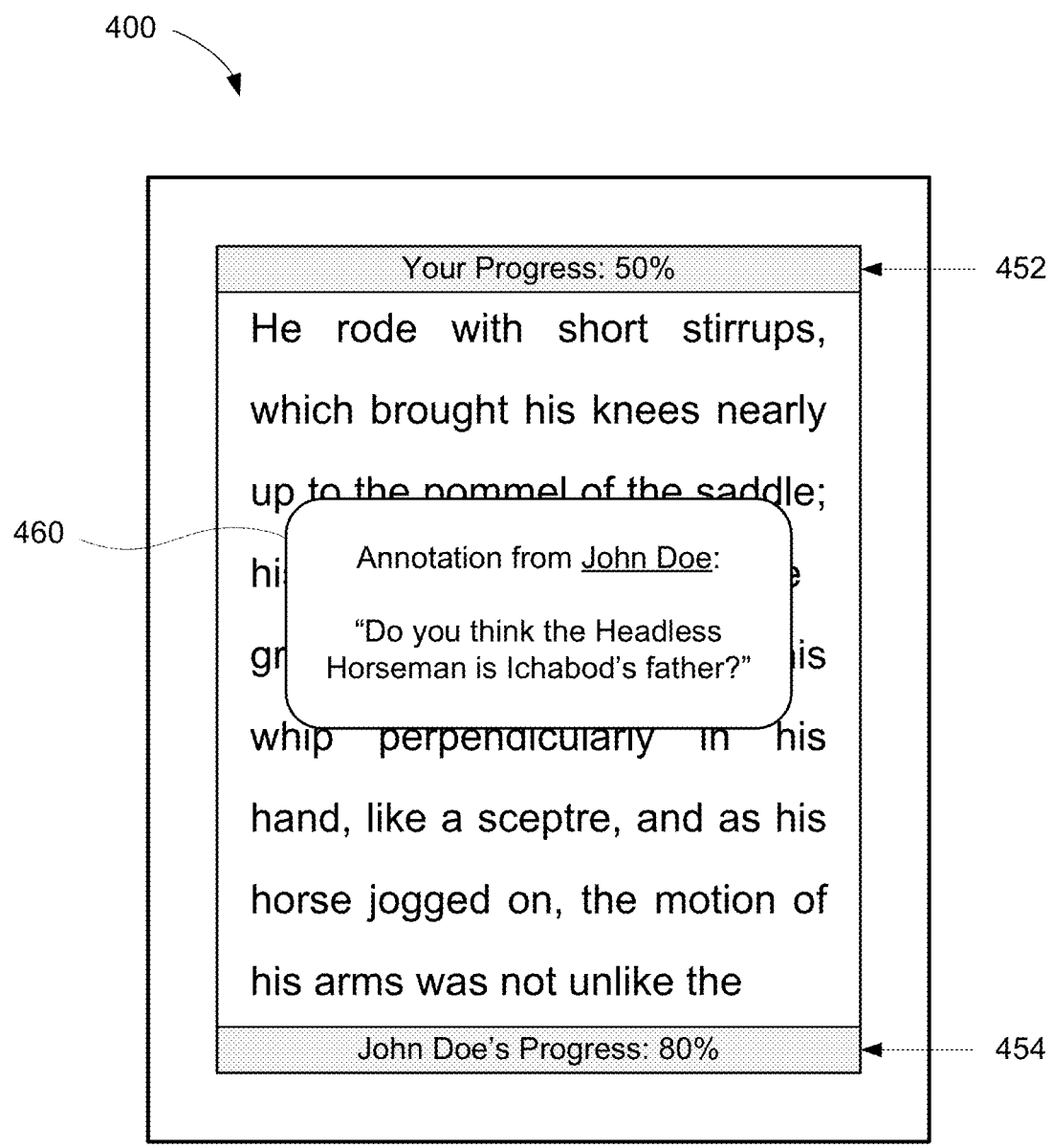
Figure 5:
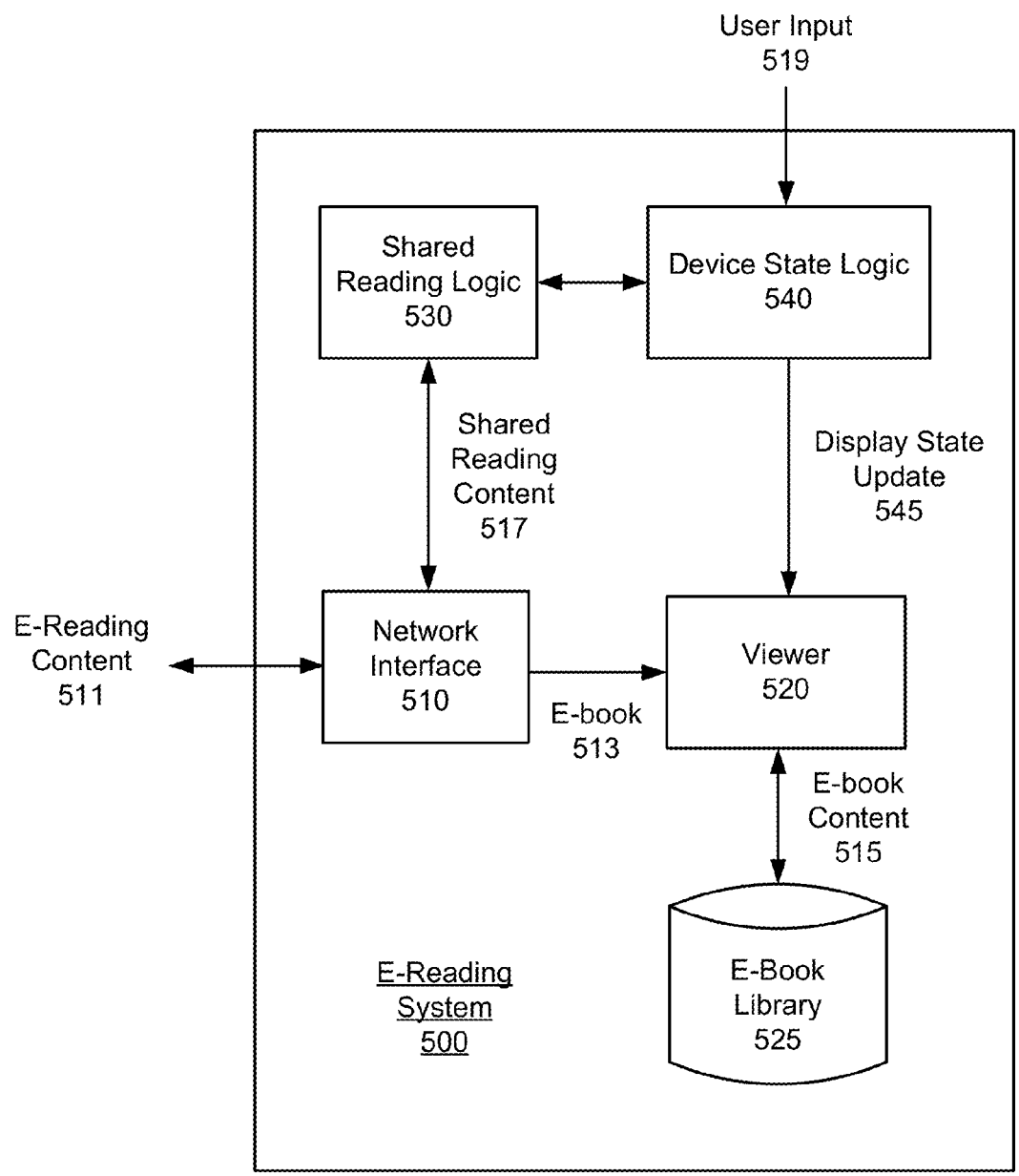
FIG. 5 illustrates an e-reading system for displaying e-book content, according to one or more embodiments.

FIG. 5 illustrates an e-reading system 500 for displaying e-book content, according to one or more embodiments. An e-reading system 500 can be implemented as, for example, an application or device, using components that execute on, for example, an e-reading device such as shown with examples of FIGS. 1, 2, 3 and 4A-4E. Furthermore, an e-reading system 500 such as described can be implemented in a context such as shown by FIG. 1, and configured as described by an example of FIG. 2, FIG. 3, and FIGS. 4A-4E.

In an example of FIG. 5, a system 500 includes a network interface 510, a viewer 520, shared reading logic 530, and device state logic 540. As described with an example of FIG. 1, the network interface 510 can correspond to a programmatic component that communicates with a network service in order to receive data and programmatic resources. For example, the network interface 510 can receive e-reading content 511 from the network service 120. More specifically, the e-reading content 511 may include an e-book 511, which the user purchases and/or downloads, and shared reading content 517 pertaining to one or more of the e-books 511. E-books 511 can be stored as part of an e-book library 525 with memory resources of an e-reading device (e.g., see memory 250 of e-reading device 200).

The viewer 520 can access e-book content 515 from a selected e-book, provided with the e-book library 525. The e-book content 515 can correspond to one or more pages that comprise the selected e-book. Additionally, the e-book content 515 may correspond to portions of (e.g., selected sentences from) one or more pages of the selected e-book. The viewer 520 renders the e-book content 515 on a display screen at a given instance, based on a display state of the device 500. The display state rendered by the viewer 520 can correspond to a particular page, set of pages, or portions of one or more pages of the selected e-book that are displayed at a given moment.

The device state logic 540 can be provided as a feature or functionality of the viewer 520. Alternatively, the device state logic 540 can be provided as a plug-in or as independdent functionality from the viewer 520. The device state logic 540 can signal display state updates 545 to the viewer 520. The display state update 545 can cause the viewer 520 to change or after its current display state. For example, the device state logic 540 may be responsive to user inputs 519 by signaling display state updates 545 corresponding to page transitions (e.g., single page transition, mufti-page transition, or chapter transition).

For some embodiments, the device state logic 540 may also be responsive to the shared reading logic 530 to enable a shared reading experience on the e-reading system 500. For example, the shared reading logic 530 may detect one or more shared e-books among members of a shared reading group based on the shared reading content 517 received via the network interface 510. The shared reading logic 530 may then activate a shared reading mode when the user of the e-reading system 500 opens or attempts to read a shared e-book. For example, the shared reading logic 530 may instruct the device state logic 540 to generate a display state update 545 prompting the user to activate a shared reading mode of the e-reading system 500.

Once the user activates the shared reading mode, the shared reading logic 530 may further augment the display state updates 545 generated by the device state logic 540 to provide the user with an enhanced reading experience. For example, the shared reading logic 530 may enable the user to view a reading progress of each group member in the shared reading experience. The shared reading logic 530 may also generate notifications when the reading progress of the user surpasses that of another group member, and vice-versa. For example, the notifications may be provided with the display state updates 545 to the viewer 520, to be displayed as an overlay on top of e-book page content 515. Still further, the shared reading logic 530 may enable the user to view and/or post annotations for the shared e-book. For example, the annotations may be provided with the display state updates 545 to the viewer 520, to be displayed as an overlay on top of e-book page content 515.

Methodology

Figure 6:
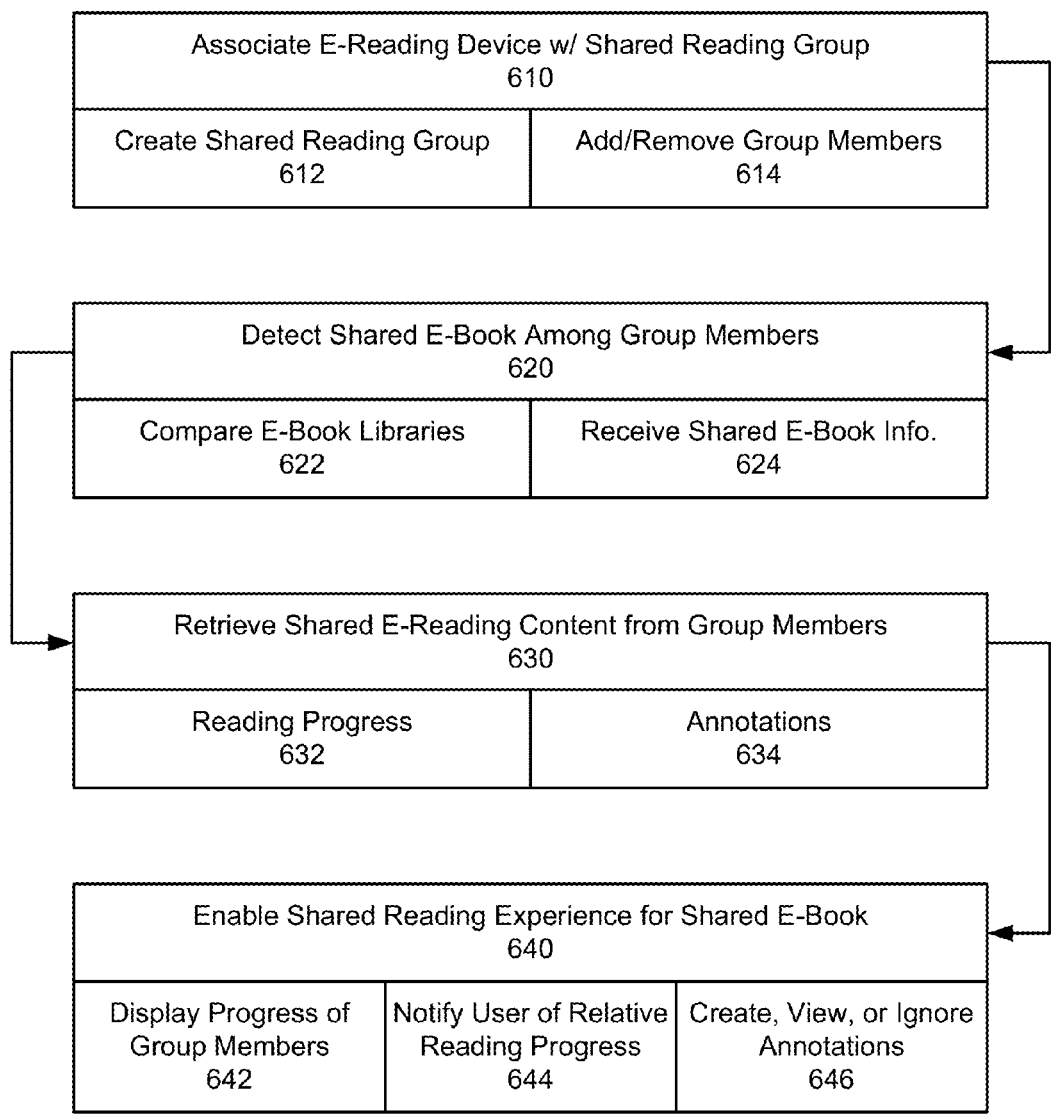
FIG. 6 illustrates a method of enabling a shared reading mode on an e-reading device, according to one or more embodiments.

FIG. 6 illustrates a method of enabling a shared reading mode on an e-reading device, according to one or more embodiments. In describing an example of FIG. 6, reference may be made to components such as described with FIGS. 2, 3 and 4A-4E for purposes of illustrating suitable components for performing a step or sub-step being described.

With reference to an example of FIG. 2, the e-reading device 200 may be associated with a shared reading group (610). The shared reading group may include one or more users of a network service (e.g., such as network service 120 of FIG. 1) in addition to the user of the e-reading device 200. For example, the shared reading logic 213 may enable the user of the e-reading device 200 to create a shared reading group by inputting the names and/or account information associated with one or more other users (612). Additionally, the shared reading logic 213 may enable the user to subsequently add new members to and/or delete old members from the shared reading group (614).

The e-reading device 200 may then detect one or more shared e-books among the members of the shared reading group (620). The shared e-books may correspond to any e-book that is owned by, and/or in the possession of, the user of the e-reading device 200 and at least one other member of the shared reading group. For some embodiments, the e-reading device 200 may identify shared e-books by comparing the e-book library of the user to the e-book libraries of other group members and looking for e-books that are common to those e-book libraries (622). In other embodiments, the e-reading device 200 may receive a list of shared e-books from a network service (624). For example, the network service 120 may compare the e-book libraries of the group members and send the results of the comparison to the e-reading device 200.

The e-reading device 200 may further retrieve shared e-reading content from group members that are in possession of one or more shared e-books (630). For some embodiments, the e-reading content may include a reading progress of each group member, with respect to a particular shared e-book (632). For example, the reading progress may indicate a current page state (e.g., page number or location identifier) and/or percentage of the shared e-book read by the corresponding group member. Further, for some embodiments, the e-reading content may include one or more e-book annotations from the other group members (634). For example, the annotations may correspond with notes or comments associated with a shared e-book that are posted by other group members.

Finally, the e-reading device 200 may enable a shared reading experience for a shared e-book (640). For example, the e-reading device 200 may activate a shared reading mode which the shared e-book to be read in a collaborative manner. For some embodiments, while operating in shared reading mode, the e-reading device 200 may display a reading progress of group members (642). For example, the reading progress may be displayed concurrently with content from the shared e-book (e.g., as shown in FIGS. 4C-4E) and/or in a separate user interface for the shared reading experience (e.g., as shown in FIG. 4B). Further, for some embodiments, the e-reading device 200 may notify the user of a relative reading progress of the other members (644). For example, the progress logic 215 may compare the reading progress of the user to the reading progress of other group members. The progress logic 215 may further generate a notification on the display 230 when the reading progress of the user surpasses that of another group member, and vice-versa.

Still further, for some embodiments, the e-reading device 200 may enable the user to create, view, and/or ignore e-book annotations (646). As described above, each annotation may be associated with a particular page state of the shared e-book and/or content provided thereon. For example, the annotation logic 217 may present one or more annotations on the display 230 when the user reaches the appropriate location in the shared e-book (e.g., as shown in FIG. 4E). In some instances, the annotation logic 217 may provide the user with the option to view or ignore annotations (e.g., as shown in FIG. 4D). The annotation logic 217 may also provide an annotation menu and/or interface for the user to create e-book annotations (e.g., as shown in FIG. 4B). For example, after the user inputs an e-book annotation, the e-reading device may send a record of the annotation along with a corresponding page state of the shared e-book (e.g., page number, location identifier, and/or associated content) to the other members of the shared reading group.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A computing device comprising:
    a display assembly including a screen;
    a housing that at least partially circumvents the screen so that the screen is viewable;
    a set of touch sensors provided with the display assembly; and
    processing circuitry configured to:
        manage an e-book library associated with the computing device, wherein the e-book library includes at least a first e-book;
        associate the computing device with a reading group having a plurality of group members;
        detect that a copy of the first e-book resides in an e-book library of a first group member of the plurality of group members; and
        in response to detecting the copy of the first e-book by detecting the first group member purchased and/or downloaded the first e-book, control the display assembly to display a notification to enable or not a shared reading mode for the first e-book for the first group member when the first group member is currently reading the first e-book, information regarding the first e-book being shared among the plurality of group members of the reading group in the shared reading mode for the first e-book.

2. The computing device of claim 1, wherein the processing circuitry is further configured to display a second notification on the screen indicating that the first e-book is shared by the first group member.

3. The computing device of claim 1, wherein the processing circuitry is configured to initiate the shared reading mode by:
    monitoring a reading progress of the first group member with respect to the copy of the first e-book; and
    displaying the reading progress of the first group member on the screen.

4. The computing device of claim 3, wherein the processing circuitry is further configured to:
    monitor a reading progress on the computing device with respect to the first e-book,
    compare the reading progress on the computing device with the reading progress of the first group member; and
    display a second notification on the screen based on the comparison.

5. The computing device of claim 4, wherein the processing circuitry is configured to display the second notification by:
    displaying the second notification when the reading progress on the computing device exceeds the reading progress of the first group member.

6. The computing device of claim 4, wherein the processing circuitry is configured to display the second notification by:
    displaying the second notification when the reading progress of the first group member exceeds the reading progress on the computing device.

7. The computing device of claim 1, wherein the processing circuitry is configured to initiate the shared reading mode by:
    enabling one or more annotations to be posted in association with the copy of the first e-book.

8. The computing device of claim 7, wherein the processing circuitry is further configured to enable the one or more annotations to be posted by:
    receiving a first input via the set of touch sensors corresponding to a first annotation;
    associating the first annotation with content pertaining to the first e-book; and
    sending the first annotation to the e-book library of the first group member to be stored in association with the copy of the first e-book.

9. The computing device of claim 1, wherein the processing circuitry is further configured to:
    receive a second annotation from the first group member, wherein the second annotation is associated with content pertaining to the first e-book; and
    selectively display the second annotation when the content is presented on the screen.

10. The computing device of claim 9, wherein the processing circuitry is further configured to:
    enable the second annotation to be ignored.

11. A method for operating a computing device, the method being implemented by one or more processors and comprising:
    managing, using processing circuitry, an e-book library associated with the computing device, wherein the e-book library includes at least a first e-book;
    associating the computing device with a reading group having a plurality of group members;
    detecting that a copy of the first e-book resides in an e-book library of a first group member of the plurality of group members; and
    in response to detecting the copy of the first e-book by detecting the first group member purchased and/or downloaded the first e-book, controlling a display assembly to display a notification to enable or not a shared reading mode for the first e-book for the first group member when the first group member is currently reading the first e-book, information regarding the first e-book being shared among the plurality of group members of the reading group in the shared reading mode for the first e-book.

12. The method of claim 11, further comprising:
    displaying a second notification on a display screen of the computing device indicating that the first e-book is shared by the first group member.

13. The method of claim 11, wherein initiating the shared reading mode comprises:
    monitoring a reading progress of the first group member with respect to the copy of the first e-book; and
    displaying the reading progress of the first group member on a display screen of the computing device.

14. The method of claim 13, further comprising:
    monitoring a reading progress on the computing device with respect to the first e-book;
        comparing the reading progress on the computing device with the reading progress of the first group member; and
        displaying a second notification on display screen based on the comparison.

15. The method of claim 14, wherein displaying the second notification comprises:
    displaying the second notification when the reading progress on the computing device exceeds the reading progress of the first group member.

16. The method of claim 14, displaying the second notification comprises:
    displaying the second notification when the reading progress of the first group member exceeds the reading progress on the computing device.

17. The method of claim 11, wherein initiating the shared reading mode comprises:
enabling one or more annotations to be posted in association with the copy of the first e-book.

18. The method of claim 17, wherein enabling the one or more annotations to be posted comprises:
receiving a first input corresponding to a first annotation;
associating the first annotation with content pertaining to the first e-book; and
sending the first annotation to the e-book library of the first group member to be stored in association with the copy of the first e-book.

19. The method of claim 17, further comprising:
receiving a second annotation from the first group member, wherein the second annotation is associated with content pertaining to the first e-book; and
selectively displaying the second annotation when the content is presented on the screen.

20. A non-transitory computer-readable medium that stores instructions, that when executed by one or more processors, cause the one or more processors to perform operations that include:
managing an e-book library associated with a computing device, wherein the e-book library includes at least a first e-book;
associating the computing device with a reading group having a plurality of group members;
detecting that a copy of the first e-book resides in an e-book library of a first group member of the plurality of group members; and
in response to detecting the copy of the first e-book by detecting the first group member purchased and/or downloaded the first e-book, controlling a display assembly to display a notification to enable or not a shared reading mode for the first e-book for the first group member when the first group member is currently reading the first e-book, information regarding the first e-book being shared among the plurality of group members of the reading group in the shared reading mode for the first e-book.

21. The computing device of claim 1, wherein the processing circuitry is further configured to control the display assembly to display a text field to input an annotation on the first e-book.

22. The computing device of claim 1, wherein the processing circuitry is further configured to control the display assembly to display an annotation by the first group member at a specific point of the first e-book.

23. The computing device of claim 22, wherein the processing circuitry is configured to control the display assembly to display the annotation by the first group member at the specific point of the first e-book when an input to view the annotation is received in response to a second notification to view or not the annotation.

24. The computing device of claim 1, wherein the processing circuitry is further configured to display a notification on the display screen indicating other group members from the plurality of group members who are reading the same e-book.

* * * * *